US008788656B2

(12) United States Patent
Moreman et al.

(10) Patent No.: US 8,788,656 B2
(45) Date of Patent: Jul. 22, 2014

(54) SYSTEM AND METHOD FOR VIDEO CACHING BASED ON AVAILABLE RESOURCES

(75) Inventors: Charles Moreman, Grayson, GA (US); Allen G. Ivester, Dacula, GA (US); Rusli Tjong, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 116 days.

(21) Appl. No.: 13/296,032

(22) Filed: Nov. 14, 2011

(65) Prior Publication Data

US 2013/0124716 A1    May 16, 2013

(51) Int. Cl.
G06F 15/16    (2006.01)
(52) U.S. Cl.
USPC .............. 709/224; 725/37; 725/40; 725/50; 725/62; 455/3.03
(58) Field of Classification Search
USPC ....................................... 709/224
See application file for complete search history.

(56) References Cited

U.S. PATENT DOCUMENTS

| 5,941,988 | A  | * | 8/1999  | Bhagwat et al.  | 726/12  |
| 6,553,411 | B1 | * | 4/2003  | Dias et al.     | 709/219 |
| 2004/0260811 | A1 | * | 12/2004 | Cherkasova      | 709/225 |
| 2009/0119238 | A1 | * | 5/2009  | Amini et al.    | 706/46  |

OTHER PUBLICATIONS

Resource-Based Caching for Web Servers Renu Tewari, Harrick M. Vin, Asit Dan and Dinkar Sitaram Dept of Computer Sciences, The University of Texas at Autin Publication date: 1997.*
Neil Black, "Cisco Knowledge Network Americas Video Series: Cisco Videoscape Media Suite," © 2010 Cisco and/or its affiliates, Feb. 2, 2011, 31 pages.
Roger Sherwood, "Cisco Knowledge Network EMEA Video Series: Cisco Videoscape Media Suite," © 2010 Cisco and/or its affiliates, Feb. 16, 2011, 32 pages.
Cisco, "Cisco Videoscape Media Suite" Data Sheet, © 2011 Cisco and/or its affiliates, 6 pages.
Cisco, "Cisco Mobile Videoscape," At-A-Glance, © 2011 Cisco Systems, Inc. and/or its affiliates, 2 pages.
Cisco, "Cisco and Service Providers: Reinventing the Television Experience. Together" White Paper, C11-639820-00, Jan. 2011, 21 pages.

* cited by examiner

*Primary Examiner* — Tauqir Hussain
(74) *Attorney, Agent, or Firm* — Patent Capital Group

(57) ABSTRACT

A method is provided in one example and includes receiving a data stream; determining a prediction of the amount of resources used to cache the data stream at a network element; identifying current resources being consumed by the network element; and determining whether to cache the data stream based on a sum of the current resources being consumed and the prediction of the amount of resources used to cache the data stream at the network element.

20 Claims, 5 Drawing Sheets

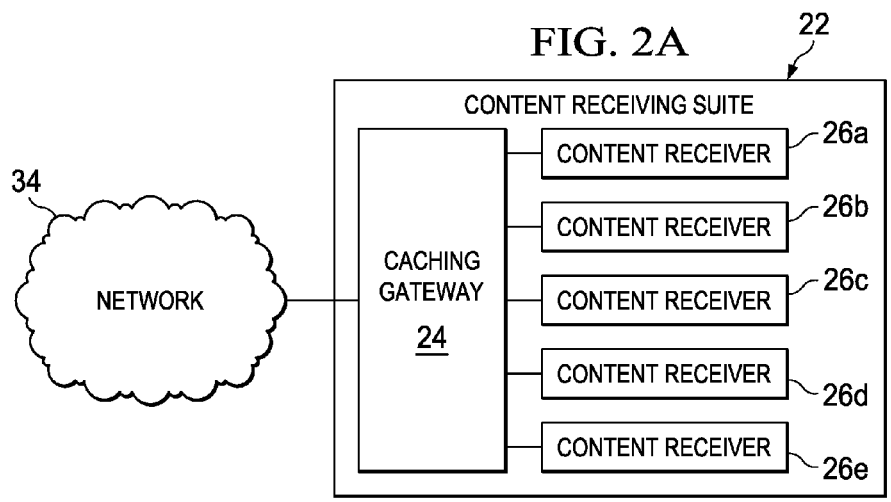
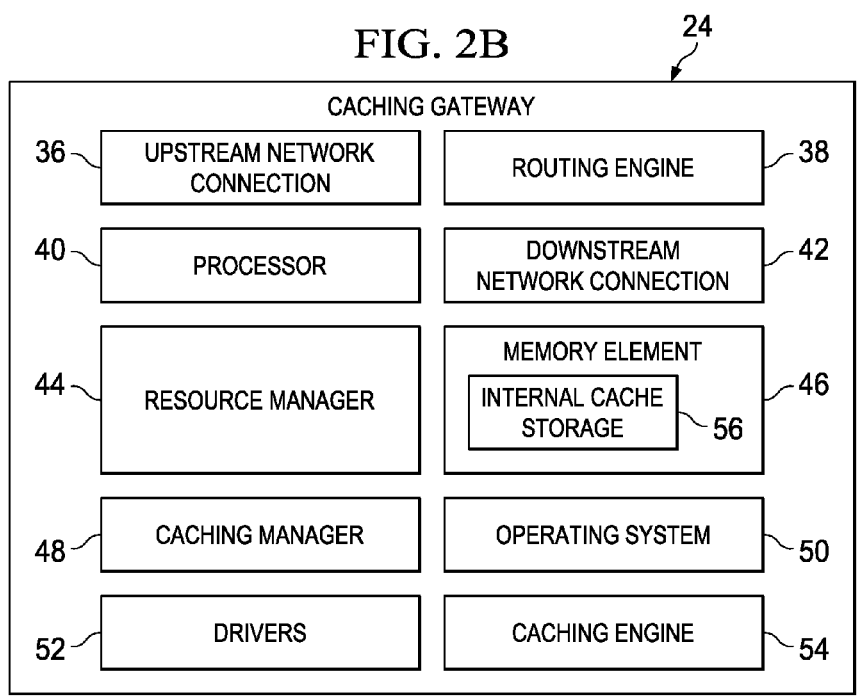

SYSTEM AND METHOD FOR VIDEO CACHING BASED ON AVAILABLE RESOURCES

TECHNICAL FIELD

This disclosure relates in general to the field of communications and, more particularly, to video caching based on available resources.

BACKGROUND

End users have more media and communications choices than ever before. A number of prominent technological trends are currently underway (e.g., more computing devices, more online video services, more Internet video traffic) that are changing the media delivery landscape. Separately, these trends are pushing the limits of capacity and, further, degrading the performance of video, where such a degradation creates frustration amongst end users, content providers, and service providers. While video information is seemingly ubiquitous, accessing this video information has proven challenging, as users are forced to navigate through a complex web of devices, networks, billing models, etc. In many instances, the video data sought for delivery is dropped, fragmented, delayed, or simply unavailable to certain end users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is a simplified block diagram illustrating possible example details associated with the communication system;

FIG. 2B is another simplified block diagram illustrating one potential operation associated with the communication system;

DETAILED DESCRIPTION OF EXAMPLE EMBODIMENTS

Overview

A method is provided in one example embodiment and includes receiving a data stream; determining a predicted amount of resources used to cache the data stream at a network element; identifying current resources being consumed by the network element; and determining whether to cache the data stream based on a sum of the current resources being consumed and the predicted amount of resources used to cache the data stream at the network element.

In more specific implementations, the predicted amount of resources used to cache the data stream is derived from a static model of resource usage of caching per-data stream. Also, the method may include determining the predicted amount of resources used to cache the data stream based on a historical pattern of the amount of resources used to cache at least one data stream. In yet other examples, the method may include determining characteristics of the data stream; and determining the predicted amount of resources used to cache the data stream based on a historical pattern of the amount of resources used to cache at least one data stream with similar characteristics.

If a sum of the current resources being consumed and the predicted amount of resources used to cache the data stream is above a threshold, the method can further include preventing the data stream from being cached. In addition, if a sum of the current resources being consumed and the predicted amount of resources used to cache the data stream is above a threshold, the method may include determining whether to pass the data stream through the network element without caching the data stream. The method may also include dropping the data stream if the sum of the current resources being consumed and a predicted amount of resources used to pass the data stream without caching is above a threshold. Also, the predicted amount of resources used to pass the data stream without caching may be derived from a static model of resource usage of passing without caching per-data stream.

Example Embodiments

Figure 1:
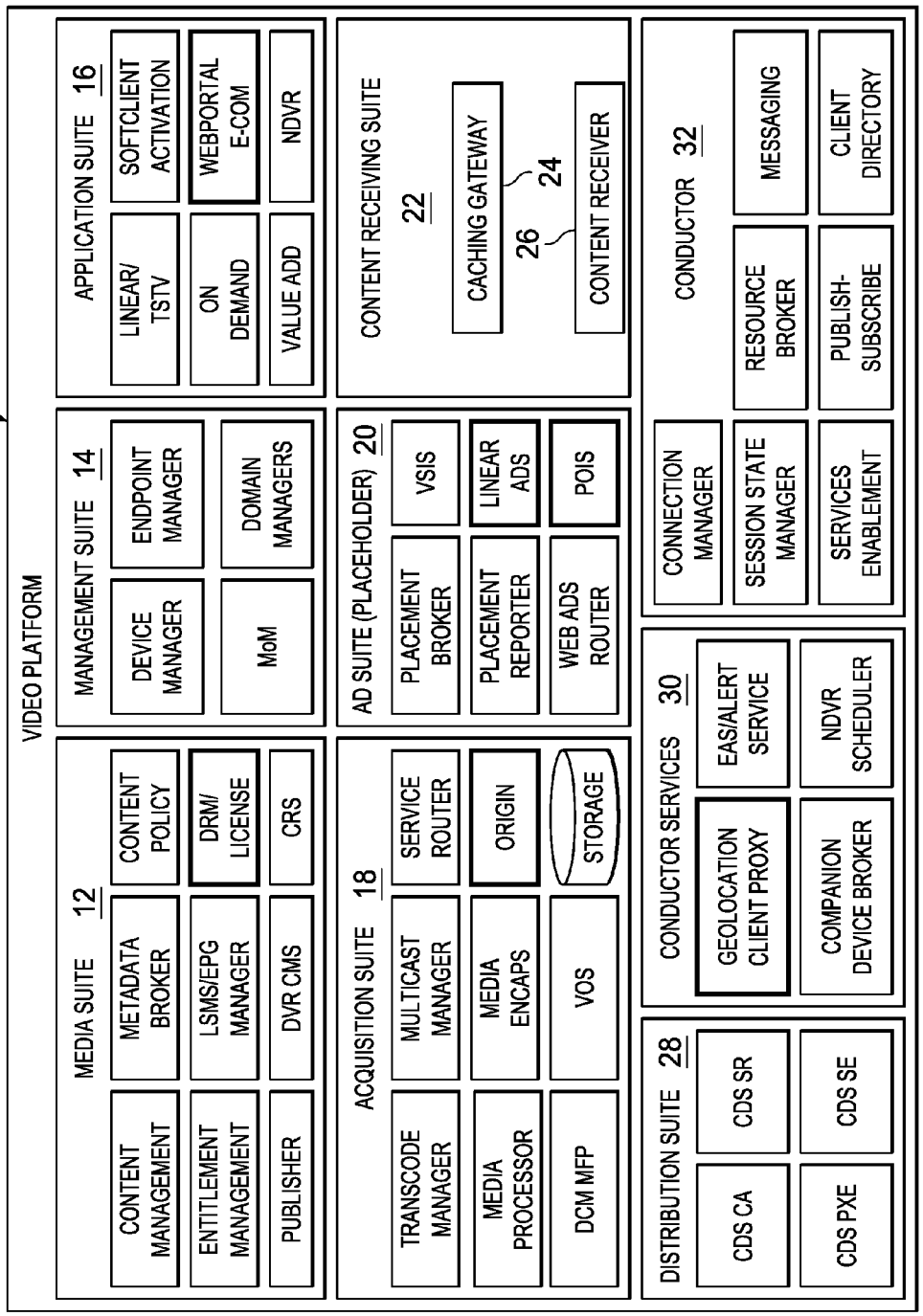
FIG. 1 is a simplified block diagram of a communication system for providing video caching for available resources in a network environment in accordance with one embodiment of the present disclosure.

Turning to FIG. 1, FIG. 1 is a simplified block diagram of a communication system 10 for the optimization of hypertext transfer protocol (HTTP) video caching for available resources in a network environment in accordance with one embodiment of the present disclosure. Communication system 10 includes a media suite 12, a management suite 14, an application suite 16, an acquisition suite 18, an ad suite 20, a content receiving suite 22, a distribution suite 28, a conductor services 30, and a conductor 32. Content receiving suite 22 contains a caching gateway 24 and a content receiver 26 in this particular implementation.

Communication system 10 (e.g., a video platform) is configured to provide downloading, streaming, and monetization capabilities associated with video services. Communication system 10 can also offer the ability to manage the sophisticated content bundling for mixed-media offerings, which may combine video, audio, games, applications, channels, and programs into digital media bundles. A range of cloud-based media and applications may be delivered across multiple end user screens by joining content, applications, and communications from various sources (e.g., linear TV, online video, video-on-demand (VoD), an end user's digital video recorder (DVR) etc.). The video service may be extended from a managed or unmanaged network, to a managed (or to an unmanaged) device. In an embodiment, communication system 10 may include a video headend and a back-office cloud, a video-optimized transport network and content delivery network (CDN), and client solutions, which extend cloud-based entertainment and applications to content receiver 26.

In operation, communication system 10 is configured to determine that if predicted resources (i.e., processor, memory, etc.) needed to cache or pass through a new data stream exceeds available resources, then the new data is not accepted (i.e., not cached or passed through). In addition, communication system 10 is configured to predict and/or detect when available resources (CPU/memory) could be exceeded and initiate a variety of actions to maintain acceptable data stream quality on as many data streams as possible. For example, if the amount of resources available to cache a new data stream are below a threshold (i.e., sufficient resources are available such that data streams currently being cached will not be affected), then the new data stream would be cached. [Note that the threshold may be a designated number (e.g., associated with particular flows, types of flows, etc.), a portion or a percentage of the available resources, or any other suitable threshold designation.] In another example, if the actual resources needed for existing streams is above a threshold (i.e., sufficient resources are not available such that data streams currently being cached will be affected), then some or all of the data streams can be degraded (i.e., passed through without being cached or dropped) to free up the system resources.

Communication system 10 can be configured to aggregate content and applications (e.g., from pay TV, online data, on-demand sources, etc.) to form a unified, personalized experience for an end user. Communication system 10 can integrate digital content from a vast library of linear and on-demand sources (as well as third-party content and applications) and, further, allow end users to search, purchase, and play the content of their choice. End users can also communicate, share, and manage both their content and services within the same multiscreen experience. By delivering cloud-based media across multiple screens, communication system 10 can effectively position a service provider network as the nexus between content receiver 26 (e.g., a device used by an end user, consumer, customer, etc.) and content providers. In addition, the service provider cloud may be extended to multiple Internet Protocol (IP) endpoints, inside and outside the home environment.

In one particular instance, communication system 10 can be associated with a service provider digital subscriber line (DSL) deployment. In other examples, communication system 10 would be equally applicable to other communication environments, such as an enterprise wide area network (WAN) deployment, cable scenarios, WiFi arrangements, WiMAX configurations, broadband generally, fixed wireless instances, fiber to the x (FTTx), which is a generic term for any broadband network architecture that uses optical fiber in last-mile architectures. Communication system 10 may include a configuration capable of transmission control protocol/internet protocol (TCP/IP) communications for the transmission and/or reception of packets in a network. Communication system 10 may also operate in conjunction with an end user datagram protocol/IP (UDP/IP) or any other suitable protocol, where appropriate and based on particular needs.

The cloud element of the communication system 10 encompasses a service provider's video back-office. Cloud solutions can be instantiated within a data center architecture. A cloud-based model may allow a more diverse media experience to be provided to end users, thereby extending the service-provider-branded experience to more screens, and delivering media services more efficiently and with better scalability. By integrating server, storage, network, and virtualization resources into a single, unified Ethernet environment, a diverse range of media services may be delivered, where the deployment of those services may be accelerated through a platform that reduces overall capital and operational costs.

Media suite 12 is configured to provide a framework for protecting and distributing content across multiple screens and devices. Media suite 12 is also configured for powering multi-content digital media services (e.g., end users can buy content on their TVs and be entitled to play that content on PCs, mobile devices, etc.). Media service operators can use media suite 12 to create assets belonging to primary asset types, including video, audio, games, applications, channels, programs, documents, and images. Assets and bundles can be designed, modeled, and customized in a variety of ways such as by creating new asset types, or by using a drag-and-drop visual bundle designer to create a package definition, etc.

Media suite 12 can offer tools for configuring and enforcing business rules, such as download-to-own, subscription, advertising, copy counts, and device restrictions, regardless of where and how end users access the content. For example, a built-in centralized rights locker stores and manages end user profile data, configured devices, and a list of end user rights to protected content. Media suite 12 contains a content management system (CMS) module, entitlement module, and publisher module (as well as other modules not discussed).

The CMS module is configured to manage steps in an asset workflow, including metadata management, transcoding, encryption, and distribution to the network. The CMS module also includes media packaging and bundling system, which allows complex packages to be modeled, distributed, and monetized as easily as a single asset. The asset workflow can allow system administrators to model sophisticated, custom workflows tailored to asset preparation for specific screens and complex metadata bundles. The CMS module can also make it possible to programmatically invoke external services as part of the workflow, and present them in an end user interface, for simple configuration.

The entitlement module provides a comprehensive framework for protecting, distributing, and monetizing content across multiple screens. The entitlement module can be configured to support customized product rules and digital rights management (DRM) use terms for subscription, rental, enterprise social technology, ad-supported, and entitlement models. Authorized content access can be authorized through conditional access or DRM license, and manage end user accounts, devices, domains, and entitlements in a universal "rights locker."

The publisher module is configured to allow video service providers to ingest asset metadata from the CMS module or any other video management system. Video service providers can then aggregate content sources to produce comprehensive, multilevel content feeds and playlists. These can form the foundation of a web-based video storefront, an aggregated streaming video portal, or such items can be delivered directly to standardized or custom-built media players. Service operators may gain the ability to augment their own content offerings with those from other providers, (e.g., Hulu, ESPN, CNN, or MTV, etc.) and, accordingly, present them in a unified interface.

Using a GUI-based multipoint ingestion engine, a publisher module can automate content ingestion and aggregation from a virtually unlimited number of network content providers and content aggregators, and allow simple configuration of entitlement levels that can be applied to channels, networks, categories, and content. The GUI-based multipoint ingestion engine is configured to offer a drag-and-drop GUI for creating categories, channels, and content playlists, as well as automated categorization using a sophisticated rules engine. In addition, the publisher module may integrate with leading advertisement-serving platforms and networks, including Video Ad Serving Template (VAST)-compliant advertisement servers, for advertising insertion.

Conductor 32 is configured to provide client and network management, emergency alert services, service orchestration, access configurations, session, policy, and resource management. In certain implementations, conductor 32 can combine various components, applications, and services (of communication system 10) into a single system, which can be used to deliver immersive cloud-based experiences at any appropriate location, and at any appropriate time.

Management suite 14 is configured to deliver managed services and third-party lifestyle management applications that go beyond entertainment, such as home security, video monitoring, and energy management: all delivered to an end user's screen of choice. Management suite 14 may also support Digital Entertainment Content Ecosystem (DECE), or UltraViolet capabilities to link end users to a new open ecosystem of cloud-based content and purchasing options. In one example, management suite 14 can allow personal content sharing across screens and devices and provide home networking options using standards such as those developed by DLNA and Home Phoneline Networking Alliance (HPNA).

In one embodiment, management suite 14 is configured to allow voice services through for Voice-over-IP (VoIP), where standard capabilities include landline and foreign exchange ports for full analog telephone adapter capabilities. Options for the voice services may include subscriber identity module (SIM) security for 3-GB and 4-GB mobile networks and the ability to connect handheld cordless phones with a USB dongle. In another example, management suite 14 can allow home security, video monitoring, and automation where content receiver 26 can allow access to third-party applications such as healthcare management, pet monitoring, security breach warnings, and video surveillance, from a gateway or remotely through the cloud. In another example, management suite 14 may allow content receiver 26 to access smart grid and energy management applications or allow third-party power management applications from a local utility or a third-party partner, both at home and on the go, to monitor and control energy usage.

Content receiving suite 22 is configured to serve as an end user's central hub for multiscreen media and applications and, further, as the managed services operator's (MSO's) gateway in the home network. The platform is configured for the distribution of IP video and content assets across managed devices, including TVs, personal computers (PC), and mobile devices. Content receiving suite 22 can be designed specifically for the needs of cable service providers as they migrate to IP video networks. In a particular embodiment, end users can even use the gateways to store and back up personal content from devices throughout the home. In another embodiment, content receiving suite 22 may provide native support for high definition whole-home DVR distribution, whether DVR functionality is provided by a home device or by cloud-based services.

In an embodiment, content receiver 26 may provide management, display, and playback features for digital media content. In an embodiment, content receiver 26 contains a media-streaming player (MSP) and media download application (MDA), which are embeddable and skinnable browser-based players. Various versions of the MSP may support playback controls, a playlist carousel, and standard, full, and widescreen resolutions. MDA components may provide a full suite of social networking capabilities, including functions for emailing a friend, embedding code for bloggers, and posting icons for major social networks.

Content receiver 26 can be configured to integrate premium programming, linear and on-demand TV, DVR recordings, and online entertainment. Content receiver 26 may also bring the cloud into the residential environment, delivering Internet, and web applications. Content receiver 26 may be configured to receive a unified video experience (e.g., linear, pay TV, broadcast, and premium content offered with online entertainment) on a single device, powered by the cloud. For example, content receiver 26 may receive more than just the Internet on TV and provide end users with a plethora of content choices, in high-definition quality. The content choices may include time-shifted video capabilities, integrated web content designed for TV viewing, optional full web browser capabilities, and interaction with multiple devices to share secure, authenticated video content with other content receivers 26 and other end user electronics devices (distribution may be managed by a service provider). This allows content receiver 26 to engage with media experiences virtually anytime and anywhere, on any screen, through a single provider. Content receiver 26 may also be configured to allow universal search and recommendation capabilities across all content sources, parental controls across all devices, local and cloud-based DVR storage, service provider-branded content stores, and other capabilities.

Delivering high-quality cloud-based media services (e.g., data streams and content) to end users, efficiently and with high quality, requires an intelligent network infrastructure. Video applications have stringent performance and resiliency requirements. Even a single lost video packet may result in a visible impairment to the end user, especially in modern video services that use compressed video applications and compression algorithms based on frame prediction, such as MPEG. In certain scenarios (in an attempt to successfully deliver high-quality cloud-based media services), the network infrastructure can be a resilient IP transport network, which meets rigorous service-level agreement (SLA) requirements (particularly for video). In a particular embodiment, communication system 10 is configured to cache content within the network close to the end user, reduce traffic (e.g., data streams) on the network when resources may overwhelm the network, and improving the overall subscriber quality of experience.

It should be noted that in practical terms, HTTP video caching (including multicast to unicast conversion) addresses a number of video management problems, but caching can also create new problems. For example, CPU and memory demands can be placed on a low-cost gateway to implement multi-stream HTTP video caching and routing. As the number of concurrent streams increases, the resources needed to cache these streams similarly increases. Other services and applications may also require resources on the same platform. If the total required resources for multi-stream caching and other services exceeds the available resources, then video services can be negatively affected (e.g., dropped flows, dropped packets, delays in the video stream, etc.).

In accordance with one example implementation, during video caching, where insufficient resources may exist, communication system 10 is configured to allow for a graceful scaling of the video caching in an attempt to reduce service interruptions on existing streams. If the predicted resources needed to accept a new video stream would cause the caching engine to run out of resources (e.g. CPU cycles, memory capacity, and/or other resources), then the new video stream may be prohibited from entering into the caching engine. By not accepting the new video stream, existing video streams can continue to be suitably cached without suffering any quality impact from the new stream. Had the new video stream been admitted to the caching engine, the performance and/or quality of one or more existing video streams would have been negatively affected.

Turning to FIG. 2A, FIG. 2A is a simplified block diagram illustrating one possible set of details associated with communication system 10. This particular configuration includes a network 34, which is coupled to content receiving suite 22. Content receiving suite 22 includes caching gateway 24 and multiple content receivers 26*a-e*. In operation, data streams (i.e., video streams) are communicated to content receiving suite 22 using network 34. After the data streams are received, caching gateway 24 can determine if the system has enough resources to process the data stream, and communicate the data stream to one or more content receivers 26*a-e*. In operational terms, if adding a new video stream(s) to caching gateway 24 would cause caching gateway 24 to exhaust its resources, and cause a loss of performance and/or quality with one more existing streams, (i.e., the amount of resources necessary to cache the new data stream is above a threshold amount of available resources), caching gateway 24 would not cache the new data stream(s). Any suitable signal can be provided to indicate this condition (e.g., returning an error code to a calling software function). In an example implementation, the predicted resource usage required to cache the new data stream(s) is derived from a static model of resource usage per-stream.

In another example, the predicted resource usage for caching the new data streams(s) can be derived from a dynamic model of resource usage per-stream. This dynamic resource model can be built from an initial static model of resource usage that is adapted over time by measuring the amount of resources consumed by each new data stream, as it is cached. Resource usage for each new data stream can be calculated by comparing the resource usage (prior to adding the new data stream) with the resources consumed if the new data stream were added to the workload. In one embodiment, the predicted resource usage for caching the new data stream(s) is derived from a dynamic model of resource usage per-data stream(s) based on the type of data in the new data stream(s). In this embodiment, different dynamic usage models of data streams may be created at various bitrates and/or using various transport methods.

In another embodiment, if new data stream(s) cannot be cached at caching gateway 24, the predicted resources needed to simply pass these data stream(s) though the caching point (routed or bridged, but not cached) may be determined. This could, for example, involve a different threshold associated with caching resources. If sufficient resources do not exist for the data stream(s) to pass through (routed or bridged, but not cached), then the data stream would not be cached or passed through, where a signal (e.g., an error code) would be returned to the calling software function. For example, if the amount of resources for passing through a new data stream is greater than (or above) a threshold amount of available resources, then the new data stream is not cached or passed through. Alternatively, if the amount of resources for passing through the new data stream is less than or below a threshold amount of available resources, then the new data stream may be cached or passed through.

In another example, the predicted resource usage required to pass through the new data stream(s) is derived from a static model of resource usage per-stream. In another example, the predicted resource usage required to pass through the new data streams(s) can be derived from a dynamic model of resource usage per-stream. This dynamic resource model can be built from an initial static model of resource usage that is adapted over time by measuring the amount of resources required for each new data stream. Resource usage for each new data stream can be calculated by comparing the resource usage prior to adding the new data stream with the resources required if the new data stream were added. In one embodiment, the predicted resource usage required to pass through the new data stream(s) is derived from a dynamic model of resource usage per-data stream(s) based on the type of data in the new data stream(s). In this embodiment, different dynamic usage models of data streams may be created at various bitrates and/or using various transport methods.

In another embodiment, caching is stopped or suspended for one or more existing data streams if the total resources needed to cache the existing data streams has caused the caching engine (within caching gateway 24) to run out of resources (e.g. CPU cycles, memory capacity, or any other resource). One or more existing data streams may be passed though (i.e., not cached), and one or more existing data streams may be dropped in order to reduce the required resource usage to a level that does not exceed the available resources. By not caching data stream(s), other data streams can continue to be cached and/or passed through while maintaining acceptable performance/quality of the data stream(s). In this example, had caching of the data stream(s) been continued, the performance and/or quality of existing data stream(s) may have been negatively affected.

In another embodiment, in order to reduce the required resource usage to a level that does not exceed the available resources, passing through one or more data streams (routing or bridging) is stopped or suspended (i.e., data stream is dropped) if the actual resources needed to pass through the one or more data streams has caused caching gateway 24 to run out of resources (e.g. CPU cycles, memory capacity, and/or other resource). By stopping the pass through of the selected data stream(s), other data streams can continue to be cached and/or passed through, while maintaining acceptable performance/quality of the data stream(s).

In regards to the infrastructure of communication system 10, content receiving suite 22 is simply reflective of a network element configured for conducting the caching activities discussed herein. As used herein in this Specification, the term 'network element' is meant to encompass servers, consoles, network appliances, proprietary devices, switches, routers, gateways, bridges, loadbalancers, firewalls, inline service nodes, proxies, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information.

Note that content receiving suite 22 may share (or coordinate) certain processing operations for any of the elements of communication system 10. Using a similar rationale, any of its respective memory elements may store, maintain, and/or update data in any number of possible manners. In one example implementation, content receiving suite 22 can include software to achieve the caching operations and capabilities, as described herein. In other embodiments, these features may be provided externally to any of the aforementioned elements, or included in some other network element to achieve this intended functionality. Alternatively, several elements (e.g., caching gateway 24 and content receiver 26) may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these switching operations. Content receiving suite 22 can also include suitable interfaces for receiving, transmitting, and/or otherwise communicating data or information in a network environment.

Network 34 represents a series of points or nodes of interconnected communication paths for receiving and transmitting packets of information that propagate through communication system 10. Network 34 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Network 34 may implement a UDP/IP connection and use a TCP/IP communication language protocol in particular embodiments of the present disclosure. A network can comprise any number of hardware or software elements coupled to (and in communication with) each other through a communications medium. Network 34 may be a cloud-based media delivery network, or part of a more generalized cloud network.

Turning to FIG. 2B, FIG. 2B is a simplified block diagram illustrating one possible set of details associated with caching gateway 24. Caching gateway 24 includes an upstream network connection 36, a routing engine 38, a processor 40, a downstream network connection 42, a resource manager 44, a memory element 46, a caching manager 48, an operating system 50, a set of drivers 52, and a caching engine 54. Resource manager 44 is configured to collect information from other system components (including routing engine 38, operating system 50, drivers 52, caching engine 54, and possibly other internal sources) to determine available internal caching gateway resources (e.g. such as available CPU, memory, DMA channels, etc.). As used herein in this Specification, the broad term 'resource' encompasses CPU cycles, memory consumption and/or memory allocations, bandwidth parameters, channel configurations, link characteristics, quality of service parameters, or any other suitable characteristic that would impact the ability of a given network element to properly service new incoming data streams.

Caching manager 48 is configured to receive requests for new data object requests from processor 40 and determine a corresponding new data stream that could correspond to the new request (i.e., it would assume similar media object requests continue sequentially to create a new data stream). Caching manager 48 may also estimate the amount of resources that will be needed to cache or route the new data stream. Caching manager 48 is also configured to obtain available resource information from resource manger 44. Using this information, caching manager 48 can compare estimated resource requirements and available resources to make a policy decision to cache, route, or deny the instant data stream (and data streams of similar future data object requests).

Processor 40 can be configured to receive traffic from downstream network connection 42 and determine if the traffic is a request for a data object (i.e., media object). If not, then the traffic may be communicated to routing engine 38. If incoming traffic includes a data object request, processor 40 may determine if the request corresponds to an existing data stream or a new data stream. If the request corresponds to a new data stream, processor 40 may pass a new data object request to caching manager 48. Processor 40 may also be configured to receive policy information for a new data stream that corresponds to the data object, store policy information for the data stream, and process data object requests using policy information (either for new or old data stream requests). For example, processor 40 may send a data object request to caching engine 54, routing engine 38, or drop (e.g., NAK) the data object request based on a policy. In an embodiment, processor 40 periodically deletes stored policy information corresponding to existing media streams that have not been active for a designated timeout period.

Caching engine 54 is configured to perform caching operations to optimize streams and to minimize upstream bandwidth requirements on the upstream network. Caching engine 54 is also configured to receive media object requests from content receiver 26. If a data object is stored internally (e.g., within internal cache storage 56 of memory element 46), caching engine 54 can respond to requests for the data object from content receiver 26 and, further, offer the data object from internal cache storage 56. If the data object is not in internal cache storage 56, caching engine 54 can (for example) proxy the request to a cloud media delivery network. When the data object is received from the cloud, caching engine 54 is configured to store the object in internal cache storage 56 and to provide the data object to the requesting content receiver 26. Caching engine 54 may also be configured to perform other methods to fill internal cache storage 56, including receiving media objects via multicast and/or quadrature amplitude modulation (QAM) delivery methods. One goal of caching engine 54 is to minimize bandwidth consumption on upstream network connection 36.

Routing engine 38 can route/forward non-cached requests for media objects from content receiver 26 to network 34. In an embodiment, network 34 may be a cloud media delivery network. Routing engine 38 may also route/forward non-cached responses for data objects from network 34 to content receiver 26, and perform network address translation (NAT) and/or other functions. Upstream network connection 36 (i.e., network 34 or a cloud-facing network interface) is configured to pass traffic to/from network 36 to/from other internal components of caching gateway 24. Downstream network connection 42 (i.e., client-facing network interface) passes traffic to/from content receivers 26*a-e* to/from other internal components of caching gateway 24.

Figure 3:
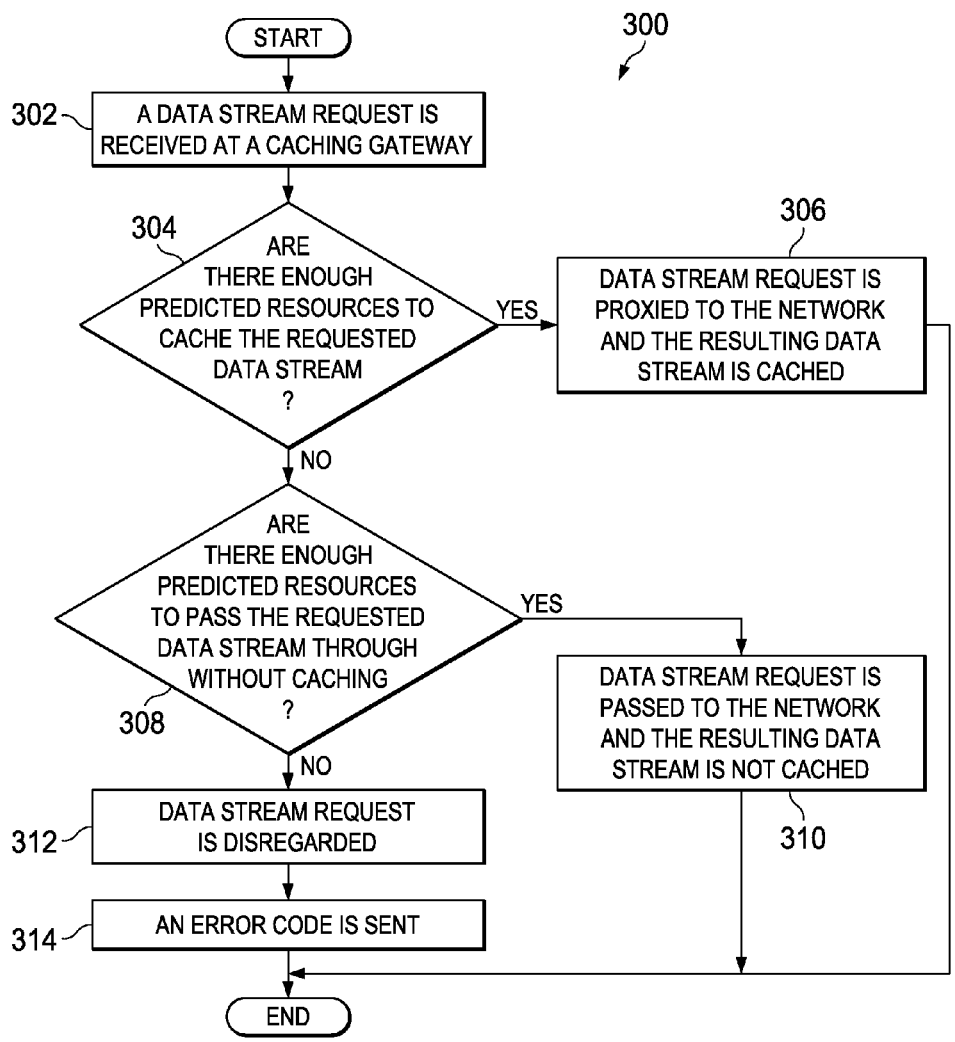
FIG. 3 is a simplified flowchart illustrating potential operations associated with the communication system.

FIG. 3 is a simplified flowchart 300 illustrating example activities of optimization of HTTP video caching for available resources in a network environment. At 302, a data stream is received at a caching gateway. For example, a data stream from network 34 may be received at caching gateway 24. At 304, the system is configured to determine if there are enough predicted resources to cache the data stream. For example, caching manager 48 in caching gateway 34 may estimate an amount of resources that will be needed to cache the data stream. If there are enough predicted resources to cache the data stream, then the data stream is cached, as shown in 306, and then the cached data is sent to a content receiver, as shown in 310. For example, the data stream may be cached in internal cache storage 56 and then sent to content receiver 26.

If there are not enough predicted resources to cache the data stream, then the system is configured to determine if there are enough predicted resources to pass the data stream through the caching architecture without performing caching, as shown in 308. For example, caching manager 48 in caching gateway 34 may estimate how much resources would be needed to route the data stream to content receiver 26 without caching. If there are enough predicted resources to pass the data stream through the caching architecture without performing caching, then the data stream is sent to the content receiver, as shown in 310, where the data stream is not cached. If there are not enough predicted resources to pass the data stream through the caching architecture without performing caching, then the data stream is not cached or passed through and a subsequent error code may be returned, as shown in 312.

Figure 4:
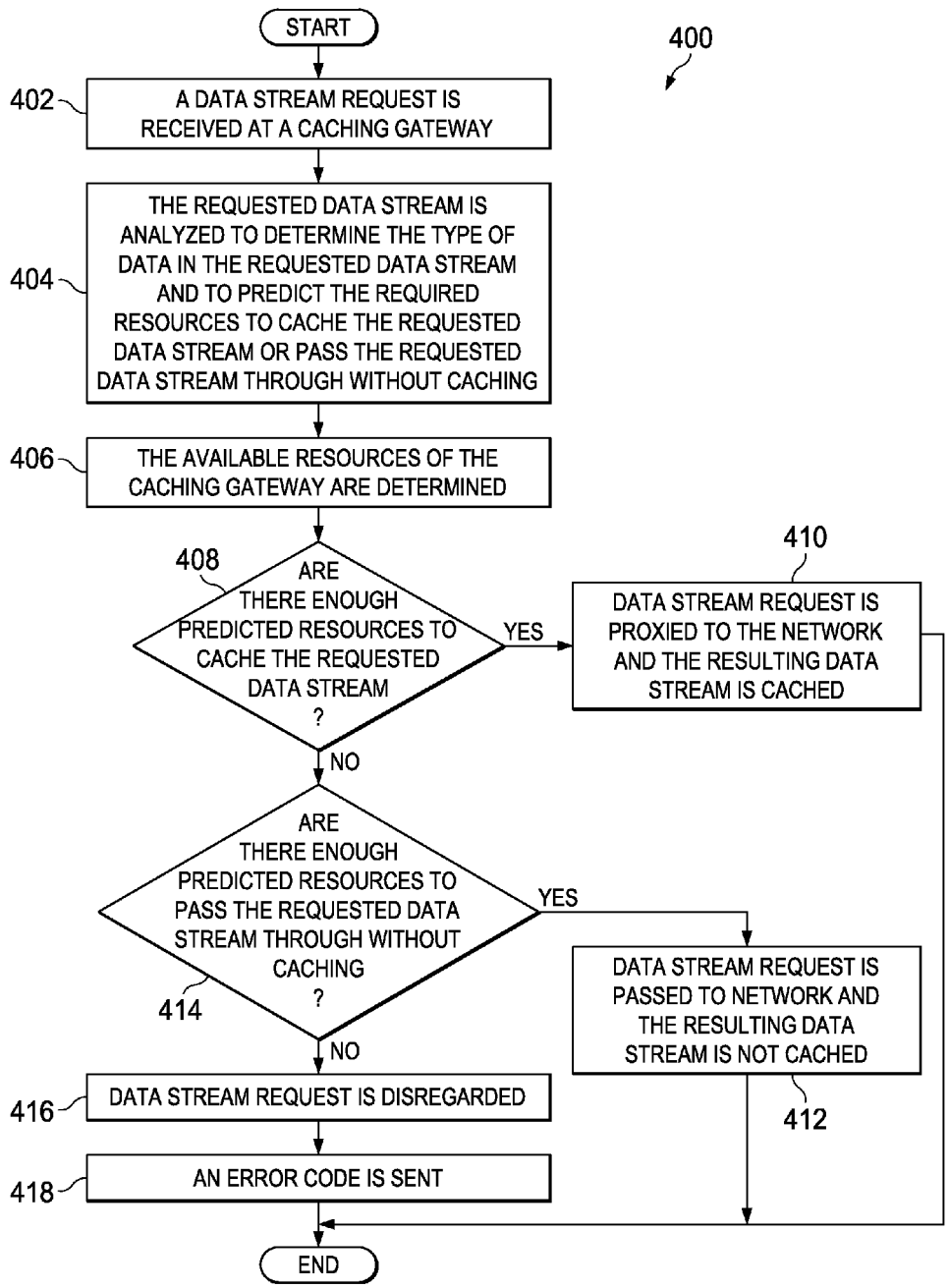
FIG. 4 is a simplified flowchart illustrating potential operations associated with the communication system.

FIG. 4 is a simplified flowchart 400 illustrating example activities of optimization of HTTP video caching for available resources in a network environment. At 402, a data stream is received at a caching gateway. For example, a data stream from network 34 may be received at caching gateway 24. At 404, the data stream is analyzed to determine the type of data in the data stream, and to predict the required resources to cache the data stream, or pass the data stream through the caching architecture without performing caching. For example, caching manager 48 in caching gateway 34 may determine the type of data in the data stream and, further, estimate the amount of resources that will be needed to cache the data stream. At 406, the available resources of the caching gateway are determined. At 408, the system determines if there are enough predicted resources to cache the data stream. If there are enough predicted resources to cache the data stream, then the data stream is cached, as shown in 410, where the cached data is sent to a content receiver, as shown in 412. For example, the data stream may be cached in internal cache storage 56 and then sent to content receiver 26.

If there are not enough predicted resources to cache the data stream, then the system determines if there are enough predicted resources to pass the data stream through the caching architecture without performing caching, as shown in 414. If there are enough predicted resources to pass the data stream through the caching architecture without performing caching, then the data stream is sent to the content receiver, as shown in 412. If there are not enough predicted resources to pass the data stream through the caching architecture, then the data stream is not cached or passed through, and an error code may be returned, as shown in 416.

Figure 5:
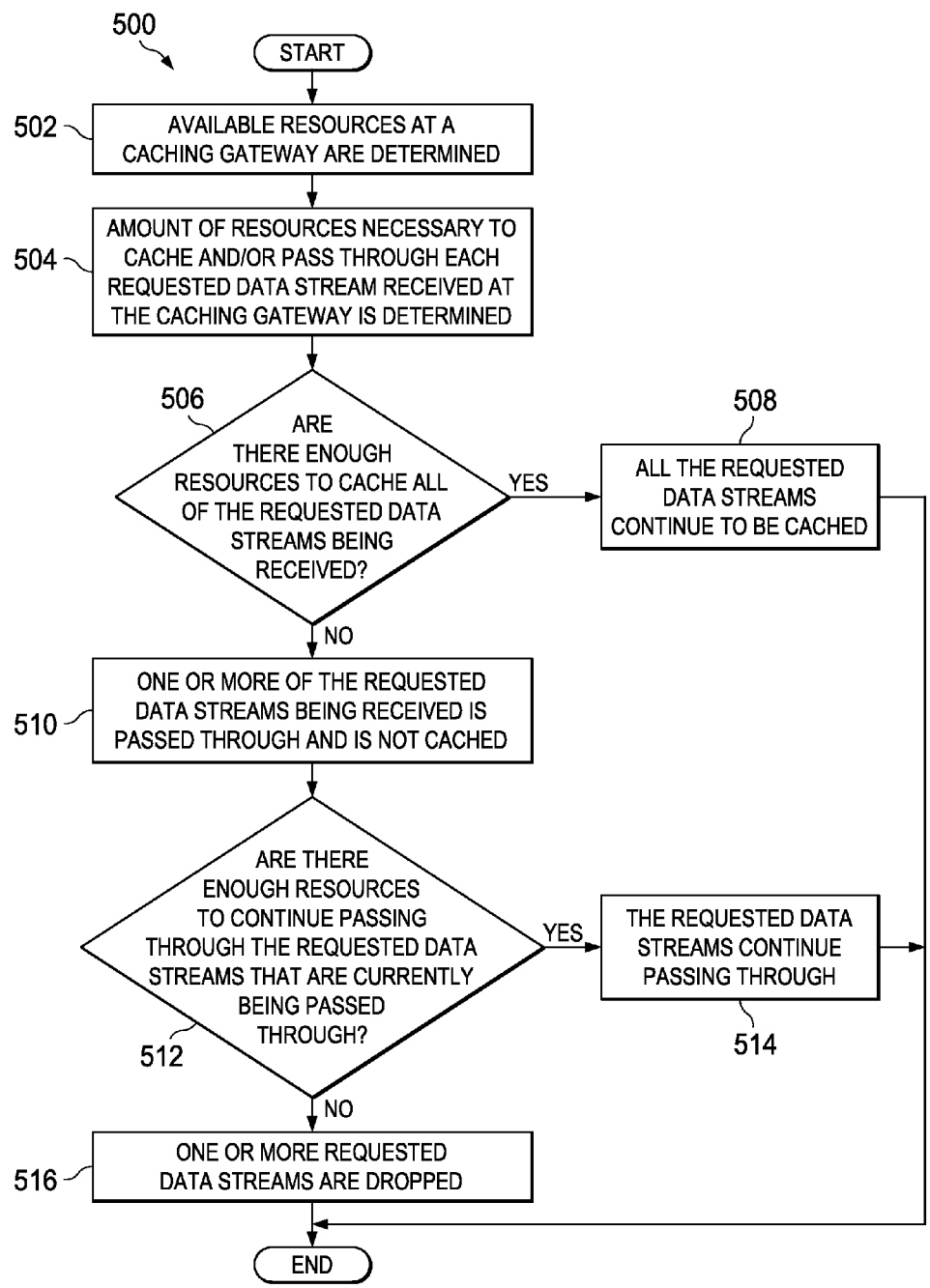
FIG. 5 is a simplified flowchart illustrating potential operations associated with the communication system.

FIG. 5 is a simplified flowchart 500 illustrating example activities of optimization of HTTP video caching for available resources in a network environment. At 502, available resources at a caching gateway are determined. For example, caching manager 48 may determine the available resources at caching gateway 24. At 504, an amount of resources necessary to cache and/or pass through each data stream received at the gateway is determined. For example, caching manager 48 may determine the amount of resources necessary to cache and/or pass through each data stream received at caching gateway 24. At 506, the system determines if there are enough resources to cache all of the data streams being received.

If the system determines that there are enough resources to cache all of the data streams, then all the data streams continue to be cached, as shown in 508. If the system determines that, there are not enough resources to cache all of the data streams, then one or more of the data streams being received is passed through and is not cached, as shown in 510. At 512, the system determines if there are enough resources to continue passing through the data streams that are currently being passed through. For example, caching manager 48 may determine the amount of resources necessary to continue to pass through each data stream received at caching gateway 24. If there are enough resources to continue passing through the data streams that are currently being passed through, then the data streams continue passing through, as shown in 514. If there are not enough resources to continue passing through the data streams that are currently being passed through, then one or more data streams are dropped. By passing one or more of the data streams through, instead of caching the data streams and/or by dropping one or more of the data streams, other data streams can continue to be cached and/or passed through, while maintaining acceptable performance/quality of the data streams being received at content receiving suite 22.

As identified previously, a network element (e.g., content receiving suite 22, caching gateway 24, etc.) can include software to achieve the caching management operations, as outlined herein in this document. In certain example implementations, the caching management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor [processor 40 shown in FIG. 2B], or other similar machine, etc.). In some of these instances, a memory element [network memory element 46 shown in FIG. 2B] can store data used for the operations described herein. This includes the memory element being able to store software, logic, code, or processor instructions that are executed to carry out the activities described in this Specification. The processor (e.g., processor 40) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the caching of data streams as outlined herein. Additionally, each of these devices may include a processor that can execute software or an algorithm to perform the caching management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a data object request;
   receiving a data stream;
   routing the data stream to a routing engine if the data stream is not being received in response to the data object request; and
   if the data stream is being received in response to the data object request:
      determining a predicted amount of resources used to cache the data stream at a network element, wherein the predicted amount of resources is derived from a dynamic module of resource usage per-data stream based, at least in part, on the type of data in the data stream;
      identifying current resources being consumed by the network element; and
      determining whether to cache the data stream based on a sum of the current resources being consumed and the predicted amount of resources used to cache the data stream at the network element.

2. The method of claim 1, wherein the predicted amount of resources used to cache the data stream is derived from a static model of resource usage of caching per-data stream when the dynamic module does not include resource usage per-data stream based, at least in part, on the type of data in the data stream.

3. The method of claim 1, further comprising:
   determining the predicted amount of resources used to cache the data stream based on a historical pattern of the amount of resources used to cache at least one data stream.

4. The method of claim 1, further comprising:
   determining characteristics of the data stream; and
   determining the predicted amount of resources used to cache the data stream based on a historical pattern of the amount of resources used to cache at least one data stream with similar characteristics.

5. The method of claim 1, wherein if the sum of the current resources being consumed and the prediction of the amount of resources used to cache the data stream is above a threshold, the method further comprises:
   preventing the data stream from being cached.

6. The method of claim 1, wherein if the sum of the current resources being consumed and the prediction of the amount of resources used to cache the data stream is above a threshold, the method further comprises:
   determining whether to pass the data stream through the network element without caching the data stream.

7. The method of claim 1, further comprising:
   dropping the data stream if the sum of the current resources being consumed and a prediction of the amount of resources used to pass the data stream without caching is above a threshold.

8. The method of claim 7, wherein the predicted amount of resources used to pass the data stream without caching is derived from a static model of resource usage of passing without caching per-data stream.

9. Logic encoded in one or more non-transitory media that includes code for execution and when executed by a processor is operable to perform operations, comprising:
   receiving a data object request;
   receiving a data stream;
   routing the data stream to a routing engine if the data stream is not being received in response to the data object request; and
   if the data stream is being received in response to the data object request:
      determining a predicted amount of resources used to cache the data stream at a network element, wherein the predicted amount of resources is derived from a dynamic module of resource usage per-data stream based, at least in part, on the type of data in the data stream;
      identifying current resources being consumed by the network element; and
      determining whether to cache the data stream based on a sum of the current resources being consumed and the predicted amount of resources used to cache the data stream at the network element.

10. The logic of claim 9, wherein the predicted amount of resources used to cache the data stream is derived from a static model of resource usage of caching per-data stream when the dynamic module does not include resource usage per-data stream based, at least in part, on the type of data in the data stream.

11. The logic of claim 9, further comprising:
    determining the predicted amount of resources used to cache the data stream based on a historical pattern of the amount of resources used to cache at least one data stream.

12. The logic of claim 9, the operations further comprising:
    determining characteristics of the data stream; and
    determining the predicted amount of resources used to cache the data stream based on a historical pattern of the amount of resources used to cache at least one data stream with similar characteristics.

13. The logic of claim 9, wherein if the sum of the current resources being consumed and the prediction of the amount of resources used to cache the data stream is above a threshold, the method further comprises:
    preventing the data stream from being cached.

14. The logic of claim 9, wherein if the sum of the current resources being consumed and the prediction of the amount of resources used to cache the data stream is above a threshold, the method further comprises:

determining whether to pass the data stream through the network element without caching the data stream.

15. The logic of claim 14, the operations further comprising:
dropping the data stream if the sum of the current resources being consumed and a prediction of the amount of resources used to pass the data stream without caching is above a threshold.

16. The logic of claim 9, wherein the predicted amount of resources used to pass the data stream without caching is derived from a static model of resource usage of passing without caching per-data stream.

17. An apparatus, comprising:
a memory element configured to store data;
a processor operable to execute instructions associated with the data;
a caching engine configured to interface with the memory element and the processor such that the apparatus is configured for:
receiving a data object request;
receiving a data stream;
routing the data stream to a routing engine if the data stream is not being received in response to the data object request; and
if the data stream is being received in response to the data object request:
determining a predicted amount of resources used to cache the data stream at a network element, wherein the predicted amount of resources is derived from a dynamic module of resource usage per-data stream based, at least in part, on the type of data in the data stream;
identifying current resources being consumed by the network element; and
determining whether to cache the data stream based on a sum of the current resources being consumed and the predicted amount of resources used to cache the data stream at the network element.

18. The apparatus of claim 17, wherein the predicted amount of resources used to cache the data stream is derived from a static model of resource usage of caching per-data stream when the dynamic module does not include resource usage per-data stream based, at least in part, on the type of data in the data stream.

19. The apparatus of claim 17, further comprising:
determining the predicted amount of resources used to cache the data stream based on a historical pattern of the amount of resources used to cache at least one data stream.

20. The apparatus of claim 17, further comprising:
determining characteristics of the data stream; and
determining the predicted amount of resources used to cache the data stream based on a historical pattern of the amount of resources used to cache at least one data stream with similar characteristics.

* * * * *